Aug. 20, 1940.        O. B. OLSON        2,211,758
AUTOMOBILE SPRING WHEEL
Filed March 20, 1939        2 Sheets-Sheet 1
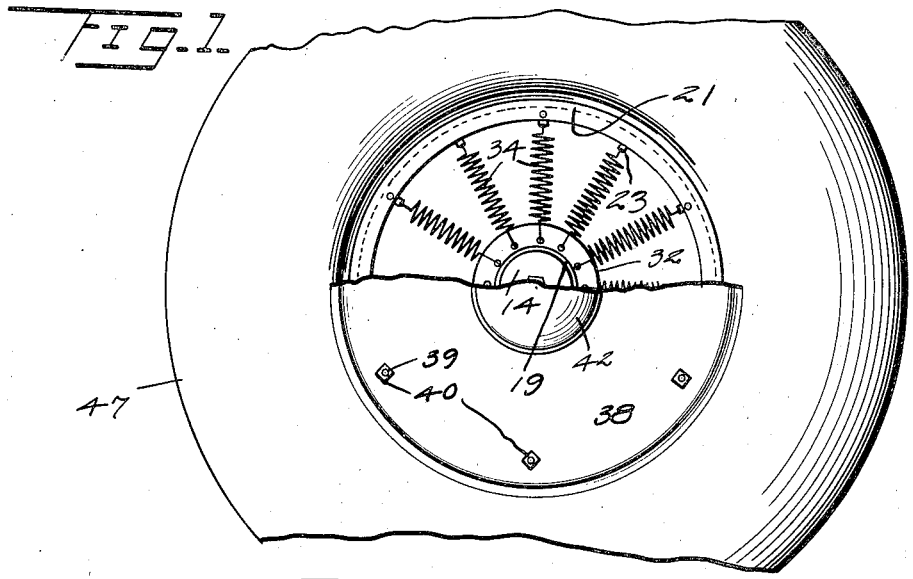
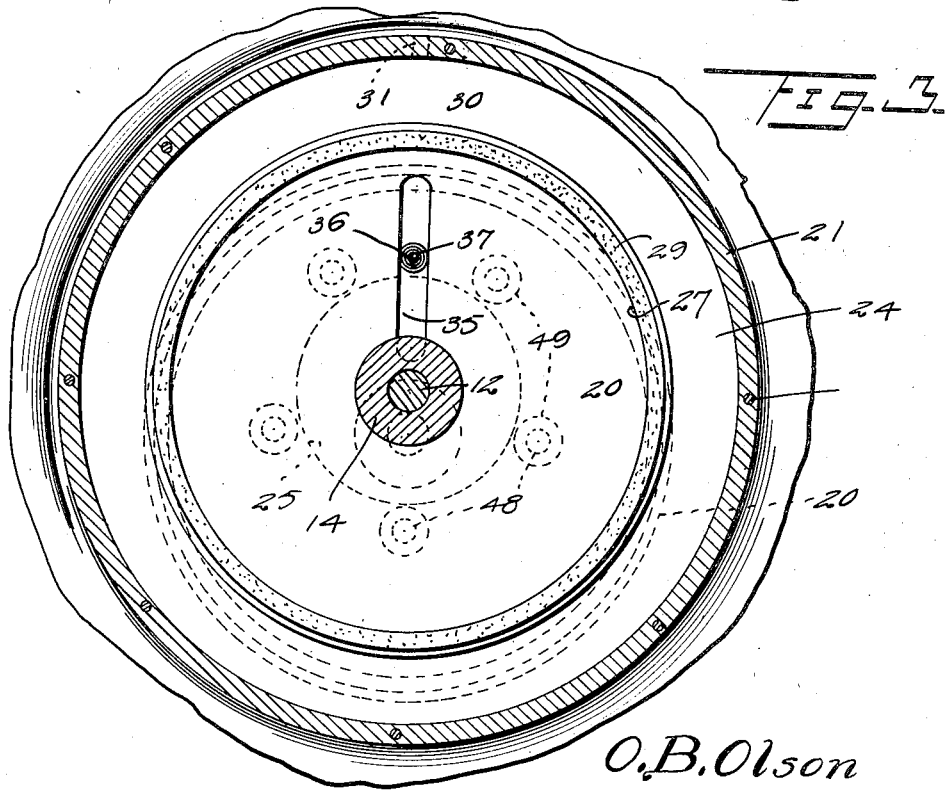
O. B. Olson
INVENTOR
BY Victor J. Evans & Co.
ATTORNEYS

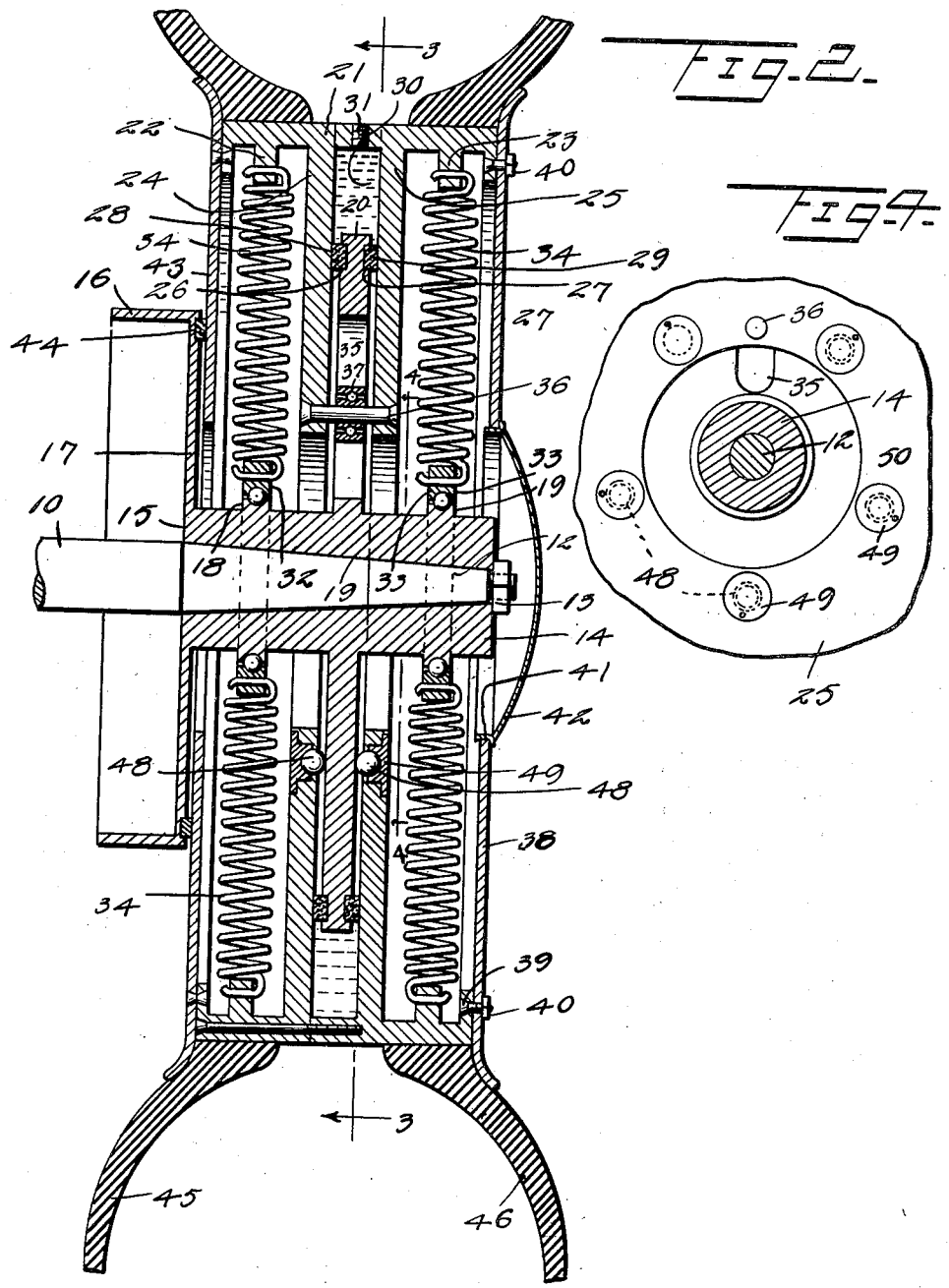

Patented Aug. 20, 1940

2,211,758

UNITED STATES PATENT OFFICE 2,211,758

AUTOMOBILE SPRING WHEEL

Oscar B. Olson, St. James, Minn.

Application March 20, 1939, Serial No. 263,025

4 Claims. (Cl. 152—111)

My invention relates broadly to wheels and more particularly to a resilient wheel in which the resiliency is in the wheel itself.

An important object of my invention is the provision of a wheel wherein the hub will be yieldably supported by the rim.

Another object of my invention is the provision of a wheel wherein the hub will be disposed in closer proximity to the rim when the vehicle is heavily loaded, thereby increasing the tractive power of the wheel and easing the strain on the engine.

Still another object of my invention is the provision of a wheel, the resilient action of which will greatly increase the comfort of persons riding in the vehicle.

Yet another object of my invention is the provision of the wheel that is simple in construction, efficient in operation and inexpensive to manufacture.

Other objects and advantages of my invention will be apparent during the course of the following description.

In the drawings, forming a part of this specification, and in which like numerals are employed to designate like parts throughout the same.

Figure 1 is a side elevation of a device embodying my invention, and showing parts broken away, Figure 2 is a vertical sectional view of the same, Figure 3 is a transverse sectional view, taken on the line 3—3 of Figure 2, and Figure 4 is a fragmentary sectional view, taken on the line 4—4 of Figure 2.

In the accompanying drawings, wherein for the purpose of illustration, is shown a preferred embodiment of my invention, the numeral 10 designates the axle spindle of an automotive vehicle to which a wheel is adapted to be journaled. The spindle is formed with an outwardly tapering shank 12 the extremity of which is screw threaded to receive the nut 13 which securely holds the hub 14 thereon. The hub 14 is formed with a brake drum 16 integrally connected thereto by the annular wall 17. The hub is formed with a pair of spaced annular beads 18 and 19, and intermediate thereof is a comparatively large annular flange 20.

The felly or rim 21 encircles the hub 14 and is provided with a pair of spaced inwardly extending flanges 22 and 23 substantially equidistant of the beads 18 and 19 on the hub. The spaced flanges 24 and 25 extend inwardly from the rim 21 intermediate of the flanges 22 and 23 and in embracing and overlapping relation to the hub flange 20. The flange 20 is provided with annular recesses 26 and 27 in which are seated the gaskets 28 and 29, the outer faces of the gaskets press against the inner faces of the spaced flanges 24 and 25 of the rim 21. The periphery of the flange 20 is of substantially less diameter than the rim 21 and a suitable viscous substance is introduced into the chamber 30 by removing the filler plug 31. The heavy oil or grease will be maintained within the chamber 30 by means of the sealing gaskets 27 and 28 and the viscous nature of the same will cushion and steady the hub flange 20. The annular beads 18 and 19 of the hub are provided with ball races 32 and 33 to which are secured a plurality of radially disposed compression springs 34. The outer ends of the springs 34 are secured to the spaced annular flanges 22 and 23 of the rim. A radial slot 35 is provided in the flange 20 and a driving pin 36 extends therethrough and with either end thereof immovably secured to the spaced flanges 24 and 25 of the rim 21. A roller bearing 37 is carried by the pin 36 within the slot 35 and permits a substantially frictionless movement of the pin longitudinally within the said slot. The pin 36 functions as a direct drive between the hub and the rim and prevents independent circumferential movement therebetween.

The outer tire flange plate 38 is secured to the outer edge of the rim by means of the bolt and nuts 39 and 40, and the center thereof is cut away, as at 41, and the hub cap 42 is secured thereon to effectively conceal and protect the parts disposed behind the said flange plate 38. An inner flange plate 43 is riveted to the inner side of the rim and extends inwardly therefrom in overlapping relation to the annular wall 17 of the brake drum 16. An annular gasket 44 is positioned between the drum and the inner tire flange plate to keep dust and dirt from entering therebetween and gaining access to the interior of the wheel. The outer peripheries of the tire flange plates 38 and 43 are bent outwardly to accommodate the tire rims 45 and 46 which support the pneumatic tire 47. A plurality of annularly spaced ball and sockets 48 and 49 are carried by the spaced flanges 24 and 25 and with the balls 48 in close frictional engagement with either side of the central hub flange 20, to prevent a binding therebetween.

The operation of my device is as follows:

The compression springs 34 will maintain the hub 14 disposed substantially centrally of the rim 21 when the vehicle is travelling on level ground, or is not carrying an excessive load. However, when heavily loaded, the weight upon the axle will be communicated to the hub proper and by it to the radially disposed springs connecting it to the rim and in turn communicated to the upper side of the rim. The entire hub member will drop slightly within the rim member, and the axis of the hub will be positioned below the true axis of the felly. An excessive movement of the hub will be prevented by the combined tensile and compressive action of the respective springs 34 which will be aided by the cushioning effect of the viscous substance in the chamber 30. The drive pin 36 will prevent independent circumferential movement of the rim with respect to the hub and the ball bearing 37 carried by the pin 36 within the slot 35 will prevent binding due to the dropping of the hub. This binding movement will also be substantially prevented by reason of the ball races 48 and 49 carried by the spaced flanges 24 and 25. The ball races 32 and 33 encircling the annular beads 18 and 19 of the hub will relieve undue strain or torque from the springs 34 as the wheel rotates.

It is to be understood that the form of my invention, herewith shown and described, is to be taken as a preferred example of the same, and that various changes in the size, shape and arrangement of parts may be resorted to without departing from the spirit of my invention, or the scope of the appended claims.

Having thus described my invention, I claim:

1. A vehicle wheel comprising a hub having an annular flange and a radial slot in the said flange, a rim having spaced flanges extending inwardly therefrom in embracing relation to but spaced laterally from the said hub flange, a shaft connecting the said spaced rim flanges and extending through the radial slot in the hub flange, sealing means interposed between the hub flange and the said spaced rim flanges, a viscous material retained between the spaced rim flanges beyond the periphery of the hub flange by the said sealing means to provide a cushioning means for the said hub flange, and a plurality of radially positioned spring means connecting the hub and the said rim.

2. A vehicle wheel comprising a hub having an annular flange and a radial slot in the said flange, a rim having spaced flanges extending inwardly therefrom and embracing the said hub flange, a shaft connecting the said spaced rim flanges and extending through the radial slot in the hub flange, annular collars carried by the hub at opposite sides of the said annular flange, annular roller bearings interposed between the said collars and the hub to permit the collars to have a free independent movement relative to the hub and a plurality of radially disposed spring means connecting the rim and the said annular collars.

3. A vehicle wheel comprising a hub having an annular flange and a radial slot in the said flange, a rim having spaced flanges extending inwardly therefrom in embracing relation to but spaced laterally from the said hub flange, a shaft connecting the said spaced rim flanges and extending through the radial slot in the hub flange, annular collars carried by the hub and spaced laterally from the opposite sides of the said annular flange, annular roller-bearings interposed between the said collars and the hub as to permit the collars to more freely and independently rotate about the hub, a plurality of radially disposed spring means connecting the rim and the said annular collars and normally holding the collars against rotation about the hub, sealing means interposed between the hub flange and the said spaced rim flanges, and a viscous material retained between the spaced rim flanges beyond the periphery of the hub flange by the said sealing means to provide a cushioning means for the said hub flange.

4. In a vehicle wheel of the class wherein the hub of the wheel is formed with an annular flange embraced by a pair of spaced flanges extending inwardly from the felly of the wheel, said flanges having a driving connection at a point laterally of the axis of the wheel, and wherein a plurality of radially disposed springs are disposed at opposite sides of the said flanges and with their ends connected to the hub and felly, respectively; the improvements comprising the application of roller bearings to the hub at opposite sides of the hub flange, said bearings having a plurality of annularly spaced openings to receive the inner ends of the springs, and being rotatable about the hub within limits determined by the springs, said bearings being adapted to relieve sudden stress on the springs caused by a substantially rapid change in the rate of rotation of the hub.

OSCAR B. OLSON.